(12) United States Patent
Brauchle et al.

(10) Patent No.: US 7,090,807 B1
(45) Date of Patent: Aug. 15, 2006

(54) DEVICE FOR SELECTIVE CATALYTIC OXIDATION OF CARBON MONOXIDE

(75) Inventors: Stefan Brauchle, Biberach (DE);
Oliver Freitag, Kirchheim (DE);
Barbara Strobel, Dornstadt (DE);
Matthias Wolfsteiner, Alesheim (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/555,899

(22) PCT Filed: Dec. 3, 1998

(86) PCT No.: PCT/EP98/07868

§ 371 (c)(1),
(2), (4) Date: Jul. 20, 2000

(87) PCT Pub. No.: WO99/29621

PCT Pub. Date: Jun. 17, 1999

(30) Foreign Application Priority Data

Dec. 4, 1997 (DE) ................................ 197 53 720

(51) Int. Cl.
*B01J 8/04* (2006.01)
*B01J 8/02* (2006.01)
*B01J 4/00* (2006.01)

(52) U.S. Cl. .................... 422/194; 422/188; 422/191; 422/193; 422/198; 422/200; 422/236

(58) Field of Classification Search ........ 422/188–191, 422/193, 194, 198, 200, 236
See application file for complete search history.

(56) References Cited

U.S. PATENT DOCUMENTS 5,874,051 A * 2/1999 Heil et al. ................. 422/171
6,190,624 B1 * 2/2001 Romatier .................. 422/200

* cited by examiner

*Primary Examiner*—Alexa D. Neckel
(74) *Attorney, Agent, or Firm*—Crowell & Moring LLP

(57) ABSTRACT

An apparatus for the selective catalytic oxidation of carbon monoxide contained in a hydrogen-rich mixed gas flow, includes a reaction chamber filled with a catalyst and a cooling chamber through which a coolant flows formed between successive plates. The plates have openings that form inlet and outlet channels for the mixed gas flow and the coolant. An oxidizing gas is supplied directly into the inlet channel for the mixed gas flow. For two-stage apparatuses, a separating plate without an opening for the inlet channel for the mixed gas flow is arranged between the first and the second stage, and an apparatus for supplying the oxidizing gas to the second stage is passed into the outlet channel for the mixed gas flow from the first stage.

10 Claims, 8 Drawing Sheets

DEVICE FOR SELECTIVE CATALYTIC OXIDATION OF CARBON MONOXIDE

BACKGROUND AND SUMMARY OF THE INVENTION

The invention relates to an apparatus for selective catalytic oxidation of carbon monoxide in a hydrogen-rich mixed gas flow.

An apparatus of this generic type and having a plate-type construction, which is intended to reduce the proportion of carbon monoxide in the gas produced by a water-vapour reformer, is disclosed in DE 195 44 895 C1. In this arrangement, plates with reaction chambers and heat-exchanger chambers are stacked on one another alternately. Each plate has four through-openings in each case for the mixed gas flow or heat carrier medium inlet and outlet. In order to allow air to be supplied with a different volume flow in each stage, holes can also be provided on the end faces of the plates having the reaction chambers, through each of which holes air can be metered into the reaction chambers. However, additional components need to be provided in order to distribute the air.

Furthermore, DE 87 09 386 U1 discloses an apparatus for using a probe, arranged in the flow direction of the first gas, in order to apply a second gas to a reaction chamber through which gas flows.

WO-A-97 25752 describes a multistage apparatus for selective catalytic oxidation of carbon monoxide, which comprises a plurality of plates, stacked on behind the other.

EP-A-0 776 861, which forms the prior art, discloses a method and apparatus for selective catalytic oxidation of carbon monoxide. In the disclosed apparatus, plates having reaction chambers and heat-exchanger chambers are alternately stacked one on top of the other. Air is supplied at the end faces of the reaction chambers.

The object of the invention is to provide an apparatus for selective catalytic oxidation of carbon monoxide in a hydrogen-rich mixed gas flow, with simplified supply and mixing for the oxidizing gas.

This object is achieved by the apparatus according to the invention.

Integration of the supply for the oxidizing gas into the inlet channel for the mixed gas flow represents a solution that is simple and cost-effective for production. In a first advantageous configuration, the supply ends in the manifold channel, where there is no catalyst material. There is thus no need for any additional mixing path or distributor structures. Furthermore, the ratio of the reaction and cooling chambers to one another can be varied as required, in terms of volume and/or the number of plates.

A plurality of stages can be integrated in one physical unit, without any problems. In this case, high flexibility is nevertheless maintained by the variable inlet position for supplying the oxidizing gas. Overall, the apparatus according to the invention has improved characteristics in terms of volume requirement, weight and costs.

Advantageous configurations of the apparatus for supplying the oxidizing gas results in reliable homogenization of the gas mixture between each individual stage.

Other objects, advantages and novel features of the present invention will become apparent from the following detailed description of the invention when considered in conjunction with the accompanying drawings.

DETAILED DESCRIPTION OF THE DRAWINGS

Figure 1:
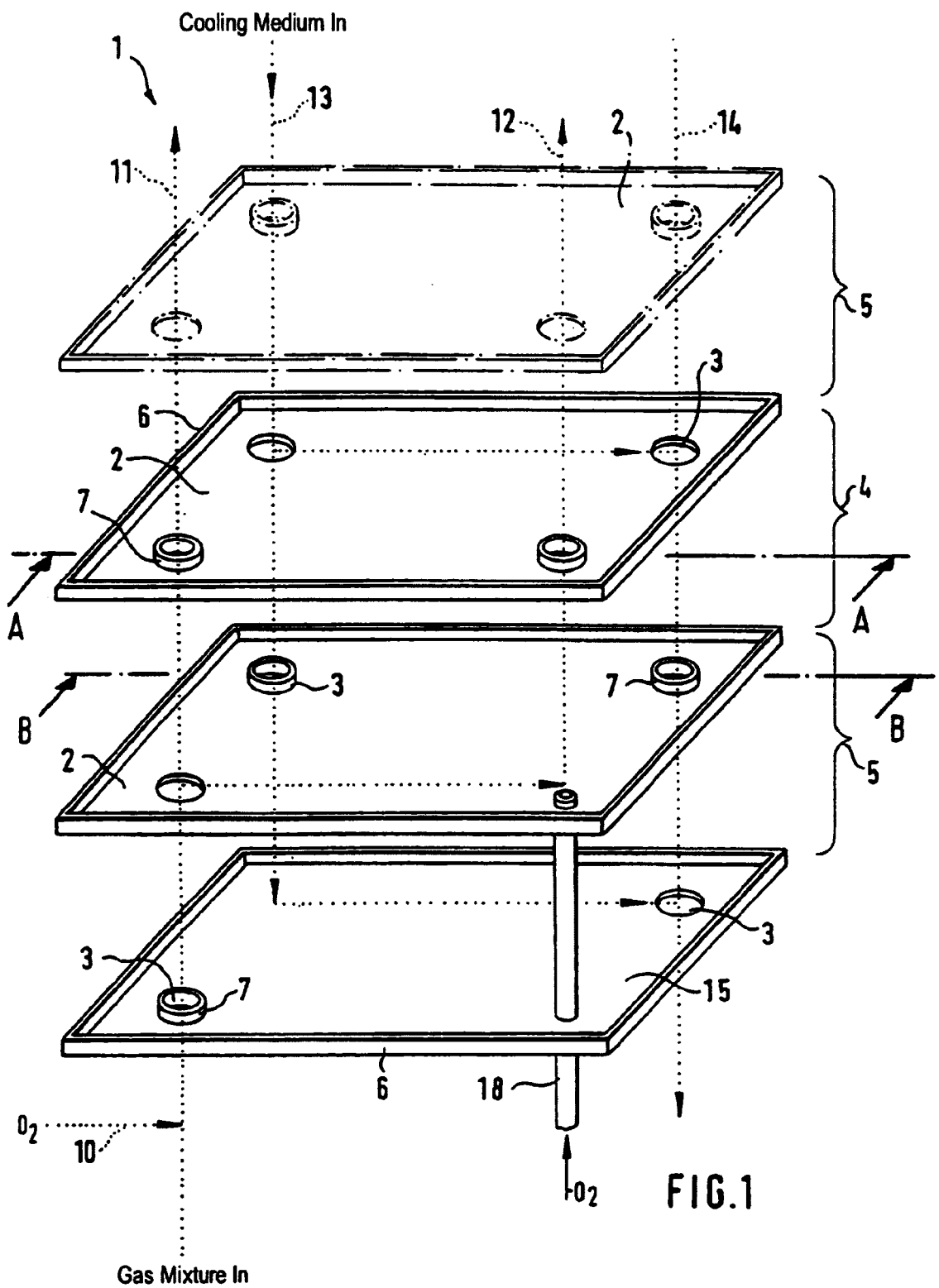
FIG. 1 shows an exploded illustration of the basic construction within a single stage of a plate apparatus for selective catalytic oxidation of carbon monoxide in a hydrogen-rich mixed gas flow.

The apparatus which is denoted overall by 1 in FIG. 1, but only part of which is shown, for selective catalytic oxidation of carbon monoxide contained in a hydrogen-rich mixed gas flow comprises a large number of plates 2 stacked on one another, with reaction chambers 4 and cooling chambers 5 being formed between adjacent plates 2 after assembly. For simplicity, FIG. 1 shows only some of the plates 2. The overall design of the apparatus 1 can be seen in FIGS. 2–7.

The apparatus shown in the exemplary embodiment for selective catalytic oxidation, referred to as a CO oxidizer 1 in the following text, is preferably used to remove carbon monoxide from the reformate from an apparatus for water-vapor reformation of a crude fuel, for example methanol. Such reformers are used in particular to produce hydrogen for mobile fuel cell applications. Fuel cells having an electrolyte membrane which passes protons, so-called PEM fuel cells, in particular, react to carbon monoxide contained in the hydrogen gas by producing toxins. The aim is thus to reduce the proportion of carbon monoxide in the hydrogen gas, using a CO oxidizer 1, by selective catalytic oxidation of the carbon monoxide with the addition of oxygen, on a suitable oxidation catalyst. Multistage CO oxidizers 1 are preferably used to reduce the proportion of carbon monoxide to values less than 50 ppm, with oxygen being supplied separately to each stage.

Although the invention is described in the following text on the basis of a CO oxidizer 1 for removal of carbon monoxide from the gas produced by an apparatus for water-vapor reformation from methanol, the field claimed is not intended to be limited to this application.

The oxygen is preferably supplied in the form of a predetermined amount of oxygen in the air. Metering apparatuses, which are not shown, can be provided for this purpose. Suitable catalyst materials for selective catalytic CO oxidation include platinum and/or ruthenium on a zeolite or aluminum oxide base. This catalyst material may be introduced into the reaction chamber 4 in any desired form. Apart from using granular material or pellets, it is also possible to apply the catalyst material to the plate surfaces or to the catalyst support units.

The addition of oxygen leads to the following competing oxidation reactions in the mixed gas flow containing hydrogen and carbon monoxide:

$CO + \frac{1}{2}O_2 \Rightarrow CO_2$ (desirable)

and $H_2 + \frac{1}{2}O_2 \Rightarrow H_2O$ (undesirable)

The catalyst material and the operating conditions are chosen in such a manner that the first reaction takes place in preference to the second reaction, that is to say selectively, and thus, although the proportion of CO in the mixed gas flow is reduced, as little hydrogen as possible is consumed at the same time. Since both reactions are exothermic, it is necessary to remove the heat produced from the CO oxidizer 1, for example using a coolant. Cooling chambers 5 are provided in the CO oxidizer 1 for this purpose.

Projections 6 are provided along each edge of the plates 2, and each come into contact with the underneath of the adjacent plate 2 during assembly, with the projections 6 and the underneath of the adjacent plate 2 being connected to one another in a gastight manner by using seals, or preferably by welding. This results in the reaction and cooling chambers 4, 5, which have already been described further above. The plates 2 also each have openings 3—referred to as holes in the following text—for the input and output, respectively, of the mixed gas flow and of the cooling media, respectively. Furthermore, annular projections 7 are arranged in places around the holes 3, and are likewise connected in a gastight manner to the underneath of the respective adjacent plate 2 during assembly of the CO oxidizer 1. Further flow guidance structures can be provided in the reaction chambers and cooling chambers 4, 5, but these are not shown in the drawing, for simplicity.

After assembly, the holes 3 in the individual plates 2 overall form an inlet and outlet channel 11, 12, respectively, for the mixed gas flow. The holes 3 form corresponding inlet and outlet channels 13, 14, respectively, for the coolant. The direction in which the media are carried in the channels 11–14 and the corresponding reaction chambers and cooling chambers 4, 5, respectively, are represented by dotted arrows in the drawing.

In order to form the reaction chambers 4 and cooling chambers 5, all the holes 3 through which the mixed gas flow or the coolant flows are now surrounded by an annular projection 7 for each plate 2. The reaction chambers 4 are thus connected, for flow purposes, only to the inlet and outlet channel 11, 12, respectively, for the mixed gas flow, while the cooling chambers 5 are connected, for flow purposes, only to the inlet or outlet channel 13, 14, respectively, for the coolant. This prevents the mixed gas flow from being mixed with the coolant.

In the illustrated exemplary embodiment, the appropriate medium in each case flows through the reaction and cooling chambers 4, 5, respectively, transversely and in the opposite direction to the flow. However, the arrangement of the channels 11–14 and the flow directions can be matched to the requirement in virtually any desired manner. Even a cross-flow arrangement is possible. Furthermore, the embodiment shown in FIG. 1 corresponds to a single stage in an apparatus having at least two stages (such as shown, for example in FIGS. 2–8), in which the oxygen required in the first stage I is supplied to the mixed gas flow upstream of the first stage I, via an external input line 10. However, it is also possible to supply the oxygen directly into the inlet channel 11 of the first stage.

Figure 6:
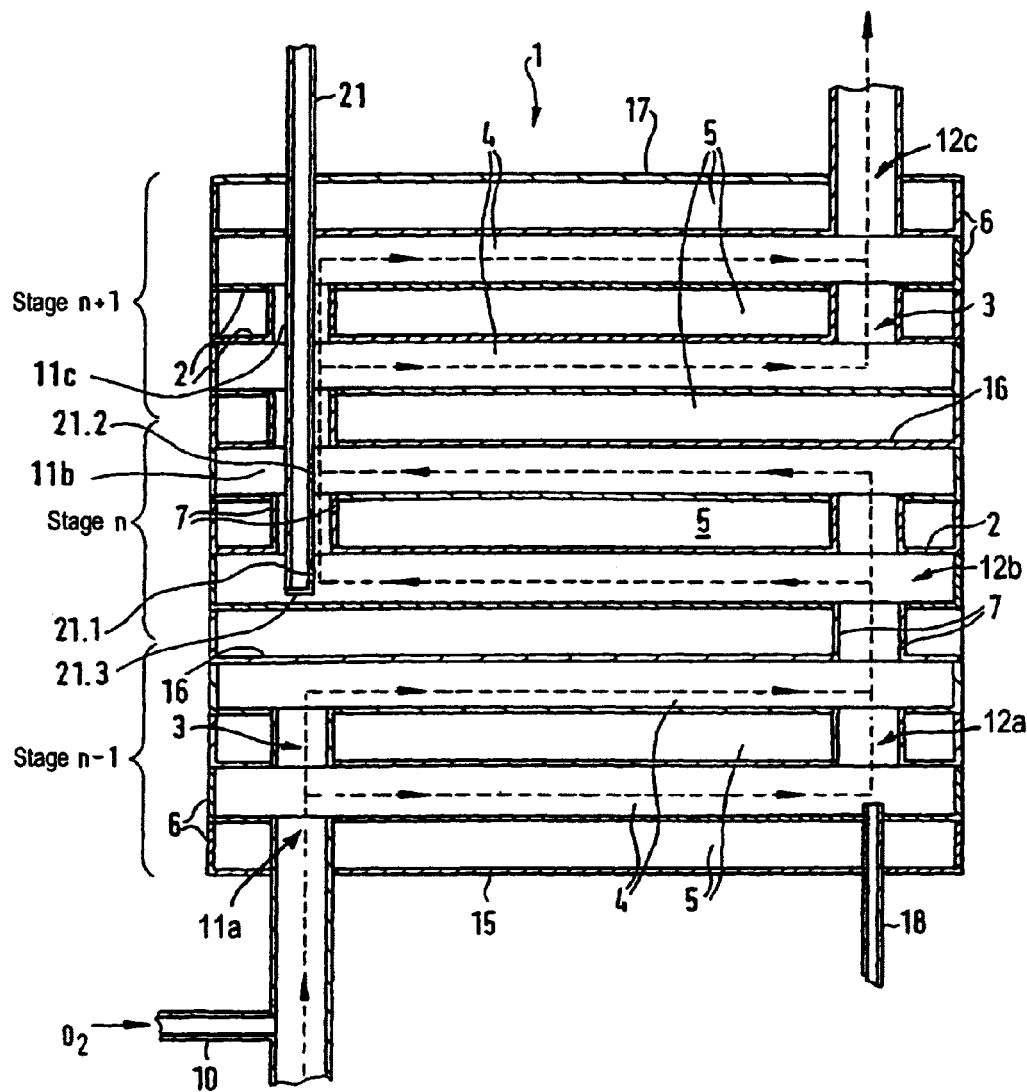
FIG. 6 shows a section through the apparatus as shown in FIG. 1, along the line A—A, for a three-stage design having a probe.
Figure 7:
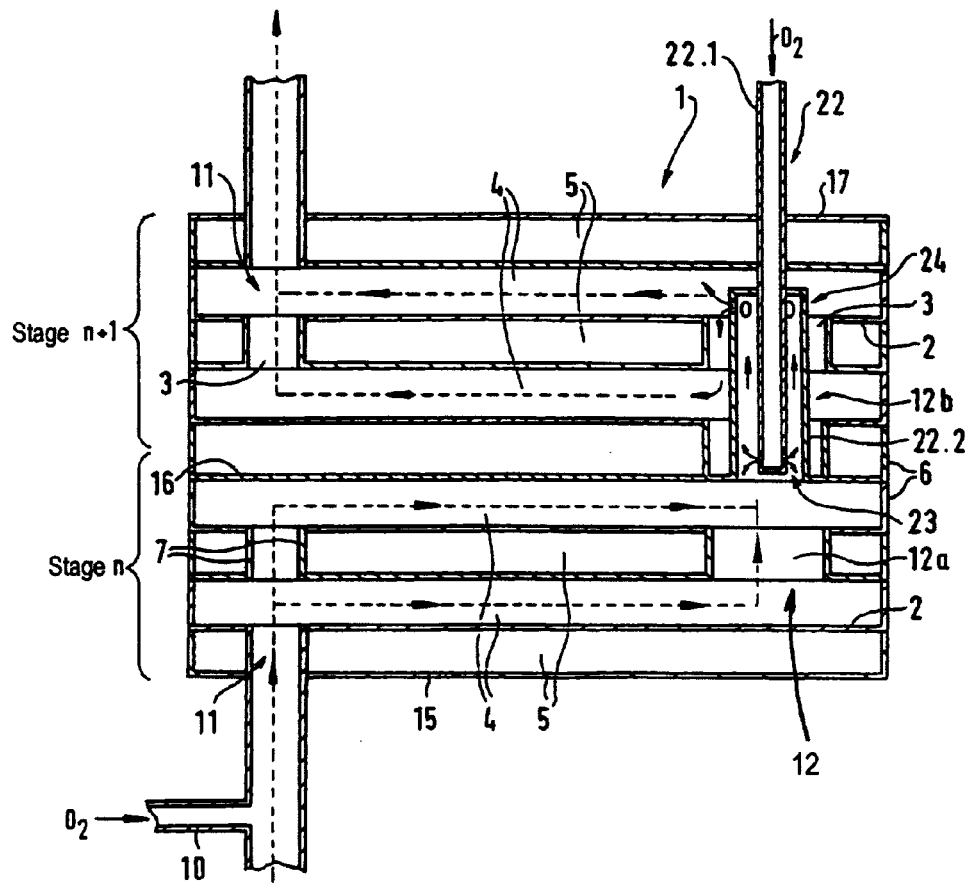
FIG. 7 shows an advantageous refinement of a probe as shown in FIG. 4.

The oxygen for the second stage II is preferably introduced into the outlet channel 12a for the mixed gas flow from the first stage I using a probe 18. (See FIG. 2.) In the simplest case, the probe 18 is in the form of a tubular pipe with any desired cross section. Since the oxygen is introduced into the outlet channel 12a from the first stage I, it is not available for the reaction in this first stage. In fact, the oxygen can mix, within the outlet channel 12a, with the mixed gas flowing out of the first stage I. Since the outlet channel 12a from the first stage I is also at the same time used as the inlet channel 12b for the second stage II, a homogenous gas/oxygen mixture is thus supplied to the reaction chambers 4 in the second stage II. Additional external mixing or distribution structures can thus be dispensed with. Further advantageous refinements of a probe 18 and of an oxygen supply are illustrated in FIGS. 6 and 7.

Figure 2:
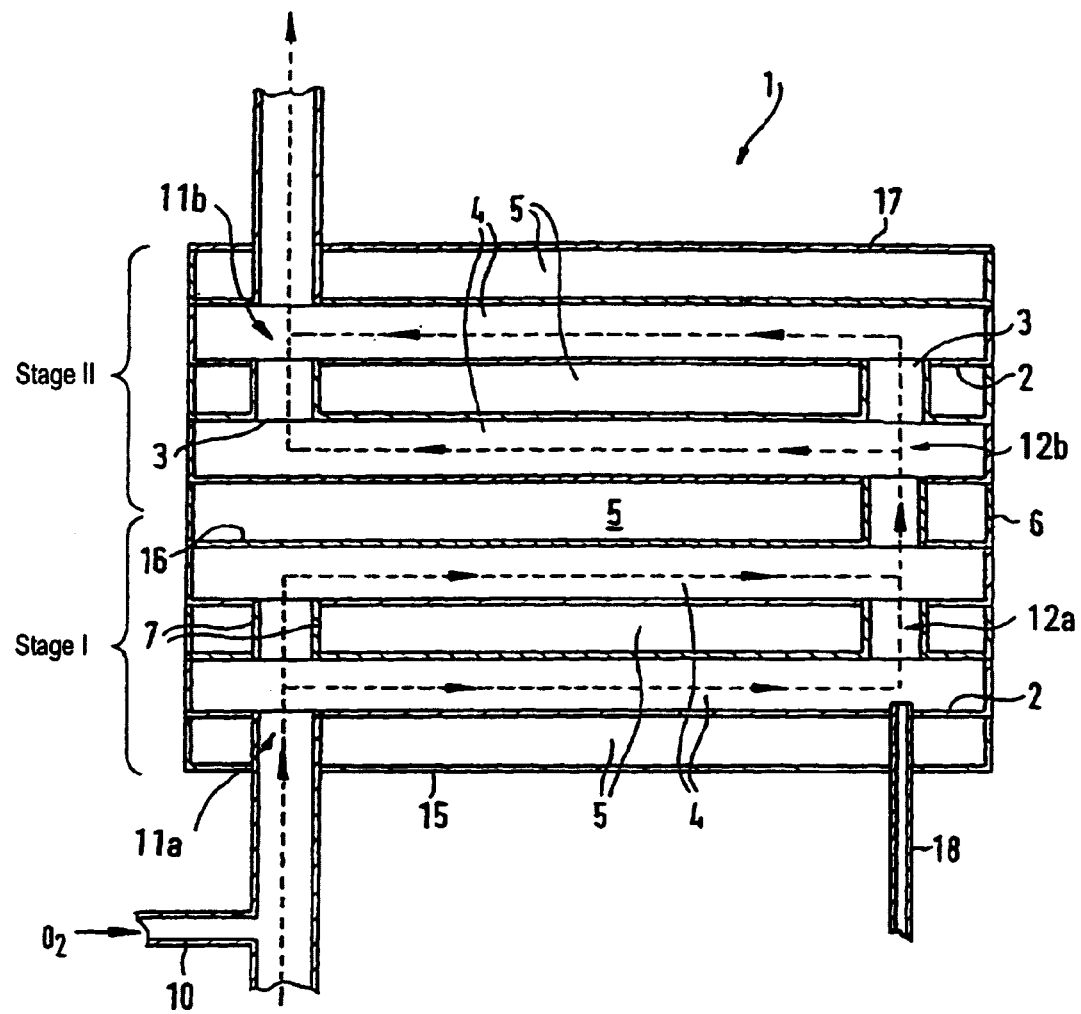
FIG. 2 shows a section through the apparatus as shown in FIG. 1, along the line A—A, for a two-stage design.
Figure 3:
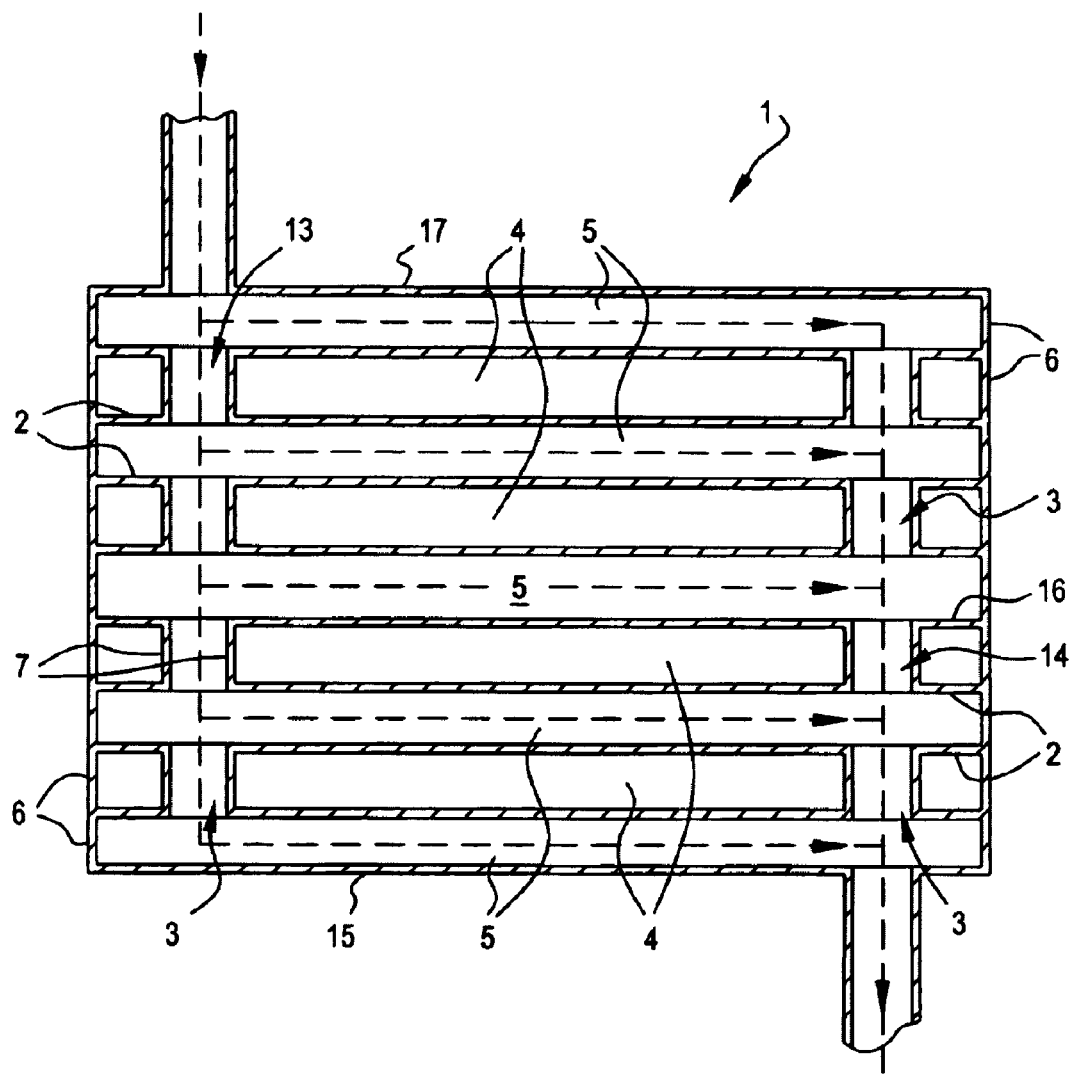
FIG. 3 shows a section through the apparatus as shown in FIG. 1, along the line B—B, likewise for a two-stage design.

The CO oxidizer 1 illustrated in FIGS. 2 and 3 comprises two oxidation stages, referred to as I and II. FIGS. 2 and 3 show section illustrations through the CO oxidizer 1, part of which is shown in FIG. 1, in the area of the inlet and outlet channels 11–14 for the mixed gas flow (FIG. 2), and for the coolant (FIG. 3). A separating plate 16 is arranged in the plate stack, in order to form two stages I, II. No hole 3 for the inlet channel 11a is provided in the separating plate 16. The inlet channel 11a for the mixed gas flow is thus sealed by the separating plate 16 at the end of the first stage I. The mixed gas flow is thus distributed between the reaction chambers 4 in the first stage I, and is collected again in the outlet channel 12a, after flowing through the reaction chambers 4. In the exemplary embodiment, only two reaction chambers 4 are provided in each of the two stages I, II. However, the number may be varied as required, thus achieving good scaleability for the overall CO oxidizer 1, and for the individual stages I, II as well. The oxygen required in the first stage I is added to the mixed gas flow, via a supply line 10, even before the first stage. However, it is also possible to supply the oxygen directly to the first stage I, via a further probe.

The function of the channels 11, 12 for the mixed gas flow is interchanged in the second stage II. The outlet channel 12a from the first stage I becomes the inlet channel 12b in the second stage II. In a corresponding manner, the outlet channel 11b in the second stage II is arranged at the point provided for the inlet channel 11a in the first stage I. The flow direction for the mixed gas flow in the second stage II is thus the opposite of that in the first stage I. The flow direction in the cooling chambers 5 remains the same.

The plate stack is bounded by end plates 15, 17, in which only some of the normal holes 3 are provided. The inlet channel 12b for the mixed gas flow is also sealed at the end of the second stage II by the upper end plate 17. The mixed gas flow is once again distributed between the reaction chambers 4 in the second stage II and is collected in the outlet channel 11b, after flowing through the reaction chambers 4, and is carried out of the CO oxidizer 1. In a corresponding manner, only one hole 3 for the inlet channel or outlet channel 13, 14 is in each case arranged in the end plates 17, 15, respectively, on the coolant side.

The oxygen for the second stage II is introduced into the outlet channel 12a from the first stage I using a probe 18. In the simplest case, the probe 18 is in the form of a single tube with a circular cross section. However, apart from a tubular probe 18, any other desired cross-sectional shapes may also be used. (FIGS. 6 and 7 show preferred configurations.) Since the oxygen is introduced into the outlet channel 12a from the first stage I, it is not available for the reaction in this first stage I. In order to distribute the oxygen better, the probe 18 may also be provided with radial outlet openings, in which case the axial opening of the probe 18 may be sealed. If the probe 18 is arranged in such a manner that the oxygen emerges in the flow direction of the mixed gas flow, then radial deflection apparatuses, which cause the oxygen to mix better with the mixed gas flow, can also be provided.

According to the exemplary embodiment, the probe 18 is passed directly from underneath, through the end plate 15, into the outlet channel 12a from the first stage I. However, it is also possible for the probe 18 to be passed from above, through the end plate 17 and the inlet channel 12b of the second stage II, into the outlet channel 12a from the first stage I.

The use of such a probe 18 has the advantage that, if the stack thickness varies, the point at which the oxygen enters the outlet channel 12a can easily be adapted by changing the length of the probe 18. Furthermore, there is no need to provide holes or the like in each plate in order to distribute and meter the oxygen adequately, leading to the apparatus being simplified, and thus to a reduction in costs.

Figure 4:
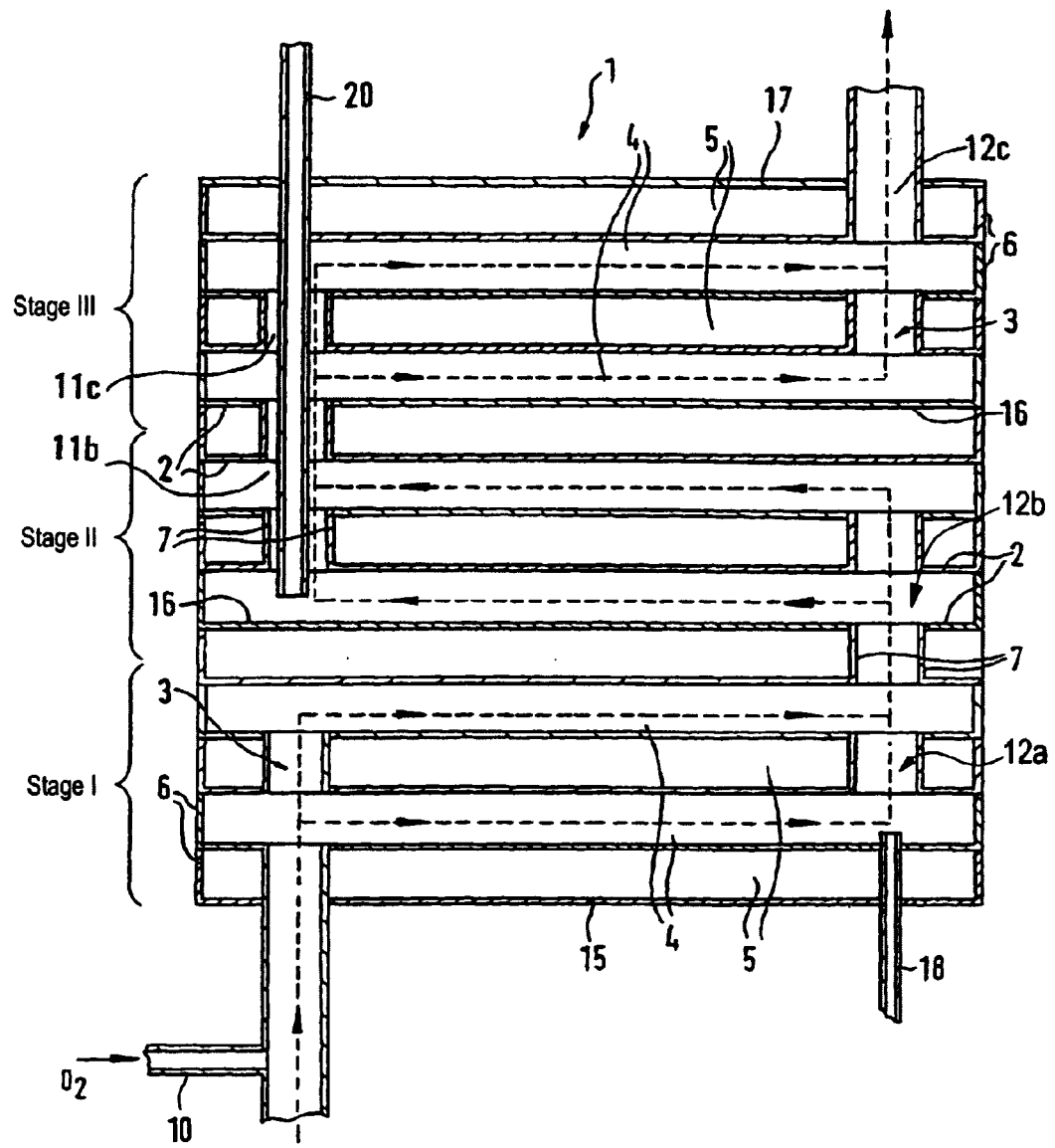
FIG. 4 shows a section through the apparatus as shown in FIG. 1, along the line A—A, for a three-stage design.
Figure 5:
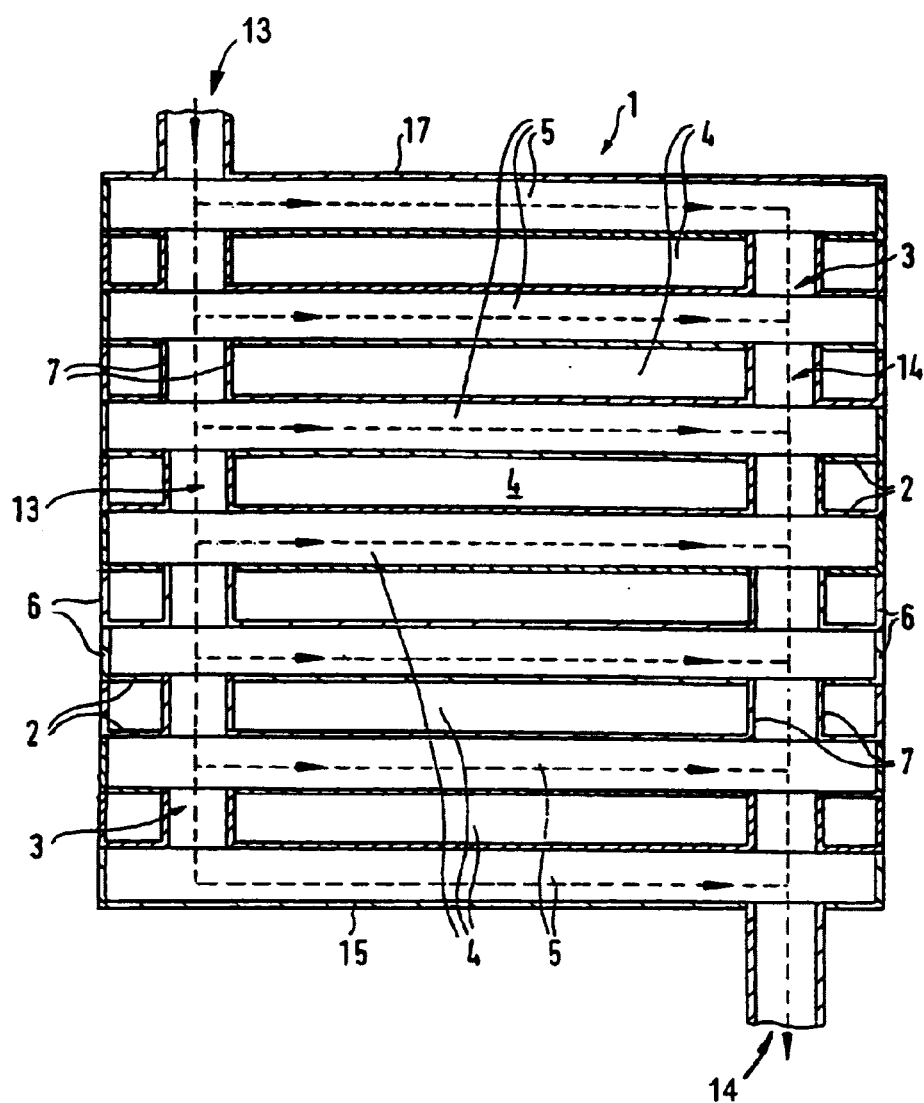
FIG. 5 shows a section through the apparatus as shown in FIG. 1, along the line B—B, likewise for a three-stage design.

The concept described above can also be applied to apparatuses having three or more stages. For example, FIGS. 4 and 5 show a three-stage CO oxidizer 1, in which identical parts are denoted by the same reference symbols as in the other figures. However, in contrast to FIGS. 2 and 3, a further separating plate 16 is provided between the second and the third stage II, III. The invention is also suitable for apparatuses having four or more stages, in which the oxidizing medium is accordingly supplied, in a corresponding manner, between two successive stages.

The flow routing in FIG. 4 corresponds to the exemplary embodiment shown in FIG. 2, as far as and including the second stage II. The outlet channel 11b for the mixed gas flow from the second stage II is, however, at the same time used as the inlet channel 11c for the third stage III in this case. However, in addition, a second probe 20 for supplying oxygen in the opposite flow direction to that of the mixed gas flow is also introduced from above through the end plate 17 into this inlet channel 11c, extends into the area of the outlet channel 11b from the second stage II, and ends there. The additional oxygen is thus introduced into the gas produced from the second stage, and can mix there with the mixed gas flow. Thus, once again, a homogeneous gas/oxygen mixture is supplied to the third stage III. The design options explained further above with reference to the probe 18 also apply to the probe 20, of course.

Since the inlet channel 11c ends before the end plate 17, the mixed gas flow is once again forced to flow through the reaction chambers 4 in the third stage III and cannot leave the CO oxidizer 1, through the outlet channel 12c from the third stage III, until it has done so. As has already been described above, even with multistage apparatuses, there are no problems in varying the number and the sequence of the reaction chambers and cooling chambers 4, 5, respectively, in the individual stages. Simple scaleability can thus also be ensured in multistage arrangements.

However, contrary to the situation shown in FIGS. 4 and 5, the probe 20 can also be passed from underneath through the inlet channel 11a for the mixed gas flow for the first stage I, and through the separating plate 16 between the first and the second stage I, II, into the outlet channel 11b from the second stage II. In principle, in all the arrangements, it is possible to introduce the probes 18, 20 into the respective outlet channel at the side, for example. However, in terms of production of the CO oxidizer, this is more complex and thus makes little sense.

No separating plates 16 are provided for the coolant side in the exemplary embodiments. However, in this case as well, it is also possible to provide such separating plates 16, so that two or more sets of cooling chambers are produced, arranged in series. Furthermore, contrary to the exemplary embodiment, the cooling media can also flow in the same direction as the mixed gas flow. In addition, an endothermic reaction can be caused to occur in the cooling chambers 5, in order to cool the CO oxidizer 1. In the case of gas generating systems for fuel cells, water and methanol, for example, could be vaporized in the cooling chambers 5, thus extracting heat from the reaction chambers 4. In this context, the coolant would be the liquid to be vaporized. At the same time, it is possible to cause a reformation reaction to take place in the cooling chambers. To achieve this, the cooling chambers 5 are filled with a suitable catalyst. A water vapor/methanol mixture is then passed as the coolant through the cooling chambers 5, with heat once again being extracted from the reaction chambers 4 of the CO oxidizer 1 during the endothermic reformation process.

A further advantageous refinement of an oxygen supply is illustrated in FIG. 6. In principle, the tubular probes described in the exemplary embodiments may have any desired cross section, such as a circular, oval or polygonal cross section. The arrangement of the reaction and cooling chambers 4, 5 is comparable to the three-stage apparatus illustrated in the previous figures. Identical elements are provided with the same reference symbols. A probe 21 extends through a stage n+1 to the stage n. The probe is sealed at its lower end 21.3.

The probe 21 is provided along its longitudinal axis with small holes, two of which 21.1, 21.2 are shown, which are arranged at the points where the individual channels 4 each enter the inlet channel 11b, corresponding to the level of the reformat flow that is flowing in. The holes 21.1, 21.2 can be arranged on one side of the probe 21, preferably in the inlet flow side of the reformat, and/or may also each be distributed radially around the probe 21. The oxygen or air volume flow is thus supplied into the manifold channel 11b to correspond to the reformat volume flow that exists locally, so that a suitable amount of oxygen is in each case present locally. On entering the inlet channel 11c, the media are then homogeneously mixed. If the metering were carried out too early, an explosive mixture could otherwise be produced, and if metering were carried out too late, uniform media distribution problems could easily occur. This can be avoided by this refinement. Frits or other conventional metering devices are also suitable for use as the probe for metering.

The solution allows the reactor to have a compact construction, while allowing a plurality of reactor stages to be integrated in one physical unit. Integration in the manifold or outlet channel avoids the need for any mixing part, which is also advantageous for physically separate reactors.

The ratio of the various reaction chambers, in particular the volume or plate thickness, can be varied as required, and the oxygen metering can easily be adapted during production by varying the distance between the holes 21.1, 21.2 in the longitudinal direction of the probe 21, and/or the diameter of the holes 21.1, 21.2, in a corresponding manner.

It is also possible to provide local metering of the oxygen only at every second, third or n-th inlet point, rather than at each point where the reformat enters the outlet channel 11. In the illustrated example, oxygen would then be metered only into the reformat from one channel, rather than into the reformat in both channels 4. Manufacture of appropriate probes 21 for arrangements with more than two cooling and/or reaction chambers per reactor stage can thus be simplified, with the costs being reduced.

A further advantageous option, in particular in a relatively long outlet channel having a relatively large number of reaction chambers, is to provide the holes in the probe 21 with an offset. This means that, for example, oxygen is metered only from a further reaction chamber in the outlet channel, for example the third or fourth, rather than at the first, foremost reaction chamber in the outlet channel.

FIG. 7 shows a detailed illustration of a further advantageous embodiment of a probe 22, which likewise allows the media to be mixed reliably and well. The fitting of conventional means to generate turbulence in order to mix the media better has little advantage owing to the formation of undesirable pressure gradients in the inlet and/or outlet channel.

One advantageous arrangement is for the probe 22 to be formed with double walls, with the oxygen being supplied through an inner tube 22.1, while the reformat is carried from the outlet channel from the preceding stage in the tube 22.2, which surrounds the inner tube 22.1. The outer tube 22.2 may be arranged coaxially around the inner tube 22.1, or else eccentrically with respect to the inner tube 22.1. It is particularly expedient for the oxygen outlet to be provided through holes 23 in the inner tube 22.1 in the area of the outlet channel, in which area the entire volume flow of the reformate from the preceding stage is joined together, that is to say roughly at the level between the last reaction chamber in the preceding stage n and the first reaction chamber in the next stage n+1. In the example in FIG. 2, the corresponding stages are n=1 and n+1=2.

The design of the probe is particularly suitable for systems with a wide load spread, for which a wide dynamic range is required.

The medium preferably flows in the opposite direction in the inner tube 22.1 to that in the outer tube 22.2. At the lower end, the oxygen passes through holes 23 out of the inner tube 22.1 into the outer tube 22.2, where it joins the reformat flowing in from the preceding stage. In the outer tube 22.2, the mixture is passed to holes 24 at the upper end of the outer tube 22.2, flowing in the opposite direction to the flow in the inner tube 22.1, and is mixed along the flow path. The mixture, which is now homogeneous, passes through the holes 24 in the outer tube 22.2 into the inlet channel of the reaction chambers in the next stage n+1, and at least part of it flows in the direction opposite to the flow direction in the outer tube 22.2, into the inlet channel of the reactor stage.

Additional mixing elements, which are not illustrated, and turbulence generators can now also be arranged between the outer tube 22.2 and the inner tube 22.1 in order to mix the media better, without this causing any pressure gradient in the inlet channel to the reaction chambers in the next stage, since the mixing region is separate from the inlet channel 12b. In FIG. 7, the probe is introduced into the inlet channel or outlet channel in the opposite direction to the flow, although it is also possible to introduce it in the flow direction.

Simple hydrodynamic measures may be adopted in order to keep any pressure loss in the inlet channel 12b as small as possible. One advantageous measure is to reduce the diameter of the coaxial probe 22 and/or to enlarge the cross section of the inlet channel 12.

Figure 8:
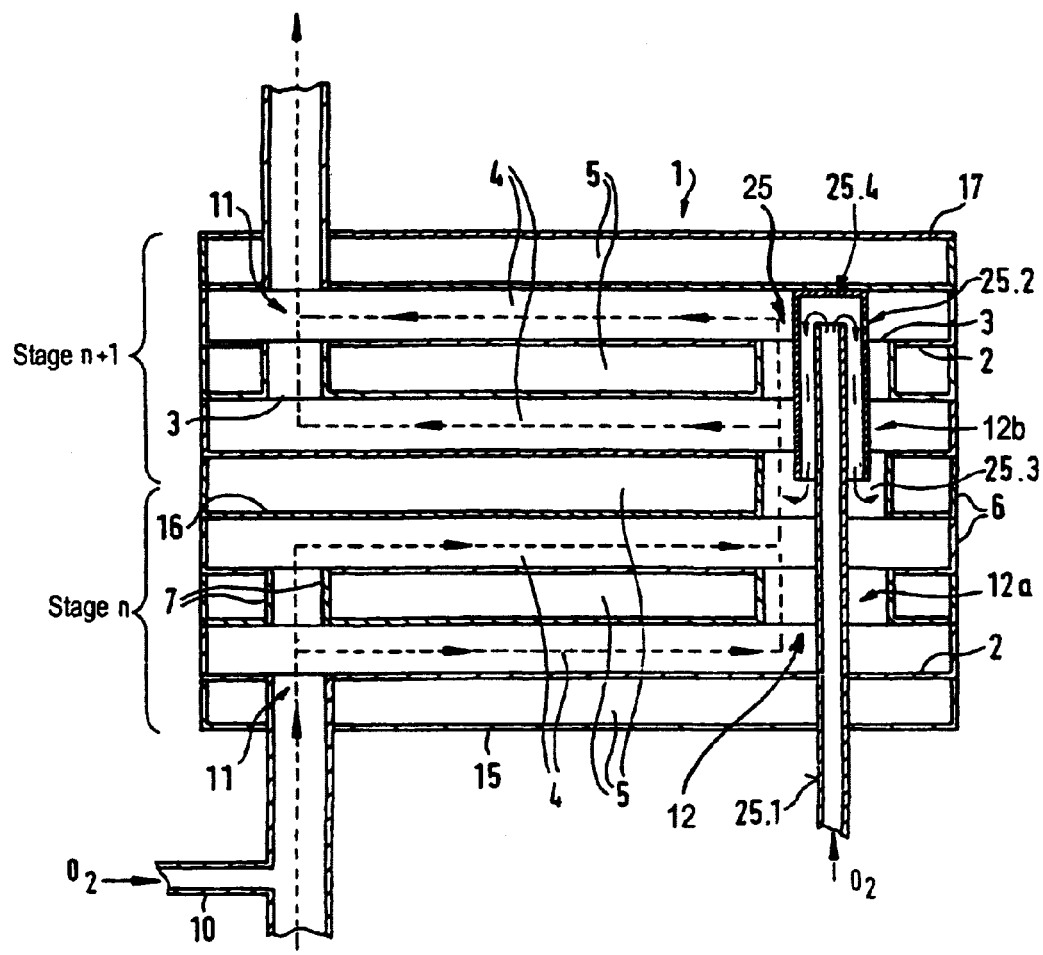
FIG. 8 shows a further advantageous refinement of a probe.

FIG. 8 shows a further advantageous configuration of a probe for supplying oxygen or air. This figure illustrates a probe 25 with an inner tube 25.1 and a deflection device 25.2 in the channel 12, in which oxygen is introduced into the channel 12, in the direction of the flow in the inner tube 25.1. The oxygen emerges from the inner tube 25.1, preferably at the lower, open end or through radial openings in the tube wall, and is deflected in the deflection device 25.2 so that the oxygen flows counter to the flow of the gas in the channel 12, between the tube 25.1 and the outer boundary of the deflection device 25.2. The oxygen in the deflection device 25.2 is preferably passed through an opening 25.3 into the area of the channel 12a, in which area the individual gas flows from the reaction chambers in the preceding stage n are joined together to form the overall volume flow, and pass into the area of the inlet channel for the following stage n+1, so that the oxygen is mixed with the overall volume flow before the mixed gas flow in the inlet channel 12b is split between the reaction chambers 4 in the following stage n+1.

The reversal apparatus 25.2 is preferably a piece of tubing which is closed at one end (25.4) in the inner tube in the flow direction of the oxygen and essentially coaxially surrounds the inner tube 25.1, or some comparable arrangement.

Various different embodiments of the probes (18, 20, 21, 22, 25) may also be used in combination in a single reactor.

It is also possible for the oxidizing medium to be metered in the input area upstream of the first stage of the reactor. This is advantageous if the reactor is preceded by another reactor, for example a reformer having a plate-type construction, or a heat exchanger. The probe for supplying the oxidizing medium is preferably introduced into the outlet flow from the upstream reactor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A multistage apparatus for selective catalytic oxidation of carbon monoxide contained in a hydrogen-rich mixed gas flow, comprising:
   a plurality of reaction chambers filled with a catalyst and a plurality of cooling chambers through which a coolant flows, said reaction chambers and cooling chambers being formed between successive plates and defining at least two stages in a plate stack, wherein said plates have openings that form inlet or outlet channels for the reaction chambers and for the cooling chambers, the reaction chambers being connected exclusively to inlet and outlet channels for the mixed gas flow, and the cooling chambers being connected exclusively to inlet and outlet channels for the coolant;
   a separating plate without any opening for inlet channels for the mixed gas flow and arranged between said at least two successive stages; and
   a first apparatus for supplying an oxidizing gas to a first stage;
   a second apparatus for supplying an oxidizing gas to at least one other stage following the first stage, wherein the second apparatus leads into an outlet channel for the mixed gas flow from a preceding stage;
   wherein the second apparatus for supplying the oxidizing gas is selected from the group consisting of i) a tubular probe that passes through an end plate into an outlet channel from the first stage; and ii) a tubular probe that passes through an end plate and an inlet channel for a second stage.

2. An apparatus according to claim 1, comprising three stages and further comprising:
   an additional separating plate without any opening for the inlet channels for the mixed gas flow for a second stage and arranged between the second and a third stage; and
   a third apparatus for supplying an oxidizing gas to the third stage leading into an outlet channel for the mixed gas flow from the second stage.

3. An apparatus according to claim 2, wherein the second apparatus for supplying the oxidizing gas is a tubular probe that passes through an end plate of the multistage apparatus, an outlet channel from the third stage, the separating plate between the second and the third stages, an inlet channel of the second stage, and into an outlet channel from the first stage.

4. An apparatus according to claim 2, wherein the third apparatus for supplying the oxidizing gas is a tubular probe that passes through an end plate of the multistage apparatus and, in an opposite direction to the mixed gas flow, through an inlet channel of the third stage, into an outlet channel from the second stage.

5. An apparatus according to claim 2, wherein the third apparatus for supplying the oxidizing gas is a tubular probe that passes through an inlet channel of the first stage and through a separating plate between the first and the second stage, into an outlet channel from the second stage.

6. An apparatus according to claim 1, wherein the first or second apparatus for supplying the oxidizing gas is a tubular probe having a plurality of outlet openings arranged at points where individual reaction chambers enter outlet channels for the mixed gas flow, in each case corresponding to a level of a reformate flow.

7. An apparatus according to claim 6, wherein the outlet openings are arranged radially around the probe.

8. An apparatus according to claim 6, wherein the outlet openings face the outlet channels.

9. An apparatus according to claim 1, wherein the oxidizing gas from the second apparatus is supplied into an area between an outlet channel of the preceding stage and an inlet channel of the following stage, in which area gas flows from the reaction chambers are combined to form an overall volume flow.

10. A multistage apparatus for selective catalytic oxidation of carbon monoxide contained in a hydrogen-rich mixed gas flow, comprising:
   a plurality of reaction chambers filled with a catalyst and a plurality of cooling chambers through which a coolant flows, said reaction chambers and cooling chambers being formed between successive plates and defining at least two stages in a plate stack, wherein said plates have openings that form inlet or outlet channels for the reaction chambers and for the cooling chambers, the reaction chambers being connected exclusively to inlet and outlet channels for the mixed gas flow, and the cooling chambers being connected exclusively to inlet and outlet channels for the coolant;
   a separating plate without any opening for inlet channels for the mixed gas flow and arranged between said at least two successive stages; and
   a first apparatus for supplying an oxidizing gas to a first stage;
   a second apparatus for supplying an oxidizing gas to at least one other stage following the first stage, wherein the second apparatus leads into an outlet channel for the mixed gas flow from a preceding stage;
   wherein the second apparatus for supplying the oxidizing gas is selected from the group consisting of i) a tubular, coaxial probe having an inner tube which, at one end has outlet openings into an outer tube which has, on an opposite end thereof, outlet openings into an inlet channel of a stage; and ii) a tubular probe comprising at one end an inner tube having one or more outlet openings into a deflection device and, on an opposite end has one or more outlet openings into an outlet channel from the preceding stage.

* * * * *